(12) United States Patent
Bartosek et al.

(10) Patent No.: US 7,708,681 B2
(45) Date of Patent: May 4, 2010

(54) CONTINUOUS POROUS BED CENTRIFUGE

(75) Inventors: Martin Bartosek, Legnano-Milano (IT); Simona Biagi, Bazzano-Bologna (IT)

(73) Assignee: ENI S.p.A., Rome (IT)

( * ) Notice: Subject to any disclaimer, the term of this patent is extended or adjusted under 35 U.S.C. 154(b) by 547 days.

(21) Appl. No.: 11/577,992

(22) PCT Filed: Nov. 3, 2005

(86) PCT No.: PCT/EP2005/011807

§ 371 (c)(1),
(2), (4) Date: Apr. 26, 2007

(87) PCT Pub. No.: WO2006/048299

PCT Pub. Date: May 11, 2006

(65) Prior Publication Data

US 2009/0139921 A1 Jun. 4, 2009

(30) Foreign Application Priority Data

Nov. 8, 2004 (IT) .......................... MI2004A2137

(51) Int. Cl.
*B04B 3/00* (2006.01)

(52) U.S. Cl. ........................ 494/36; 494/901

(58) Field of Classification Search ............... 494/2, 494/3, 36, 40, 43, 67, 901; 210/360.1, 380.1
See application file for complete search history.

(56) References Cited

U.S. PATENT DOCUMENTS

| | | | |
|---|---|---|---|
| 868,288 A * | 10/1907 | Nilsson et al. ................ 494/36 |
| 955,890 A * | 4/1910 | Marshall ....................... 494/36 |
| 1,032,641 A * | 7/1912 | Wright ......................... 494/36 |
| 1,482,418 A | 2/1924 | Unger | |
| 2,594,445 A * | 4/1952 | Keith, Jr. ..................... 494/36 |
| 3,273,324 A * | 9/1966 | Jennings ...................... 55/404 |
| 3,432,091 A * | 3/1969 | Beazley ....................... 494/36 |
| 3,438,571 A | 4/1969 | Murkes et al. | |
| 3,445,062 A | 5/1969 | Loddenkemper et al. | |
| 3,529,767 A | 9/1970 | Keith, Jr. et al. | |
| 3,847,810 A | 11/1974 | Tulumello | |
| 3,879,294 A * | 4/1975 | Ellis et al. .................... 210/354 |
| 4,026,462 A | 5/1977 | Tenthoff et al. | |
| 4,209,127 A * | 6/1980 | Khapaev ........................ 494/1 |
| 4,279,741 A * | 7/1981 | Campbell ..................... 209/44 |
| 5,707,519 A * | 1/1998 | Miller et al. ................. 210/354 |
| 5,776,354 A | 7/1998 | van der Meer et al. | |
| 7,235,177 B2 * | 6/2007 | Herman et al. ........... 210/360.1 |
| 2009/0139921 A1 * | 6/2009 | Bartosek et al. ............. 210/137 |

FOREIGN PATENT DOCUMENTS

| | | | |
|---|---|---|---|
| DE | 3405153 A1 * | 8/1985 |
| EP | 0 995 496 | 4/2000 |
| FR | 2 336 158 | 7/1977 |
| GB | 258 629 | 9/1926 |
| WO | 00 32297 | 6/2000 |

* cited by examiner

*Primary Examiner*—Charles E Cooley
(74) *Attorney, Agent, or Firm*—Oblon, Spivak, McClelland, Maier & Neustadt, L.L.P.

(57) ABSTRACT

A porous bed centrifuge for continuous separation of immiscible liquids, for example water and mineral oil/petroleum, obtained by a modification to conventional disk centrifuges for increasing their efficiency, wherein the disks have been substituted by a filling of solid particles that act as a filtrating and coalescent bed.

16 Claims, 1 Drawing Sheet

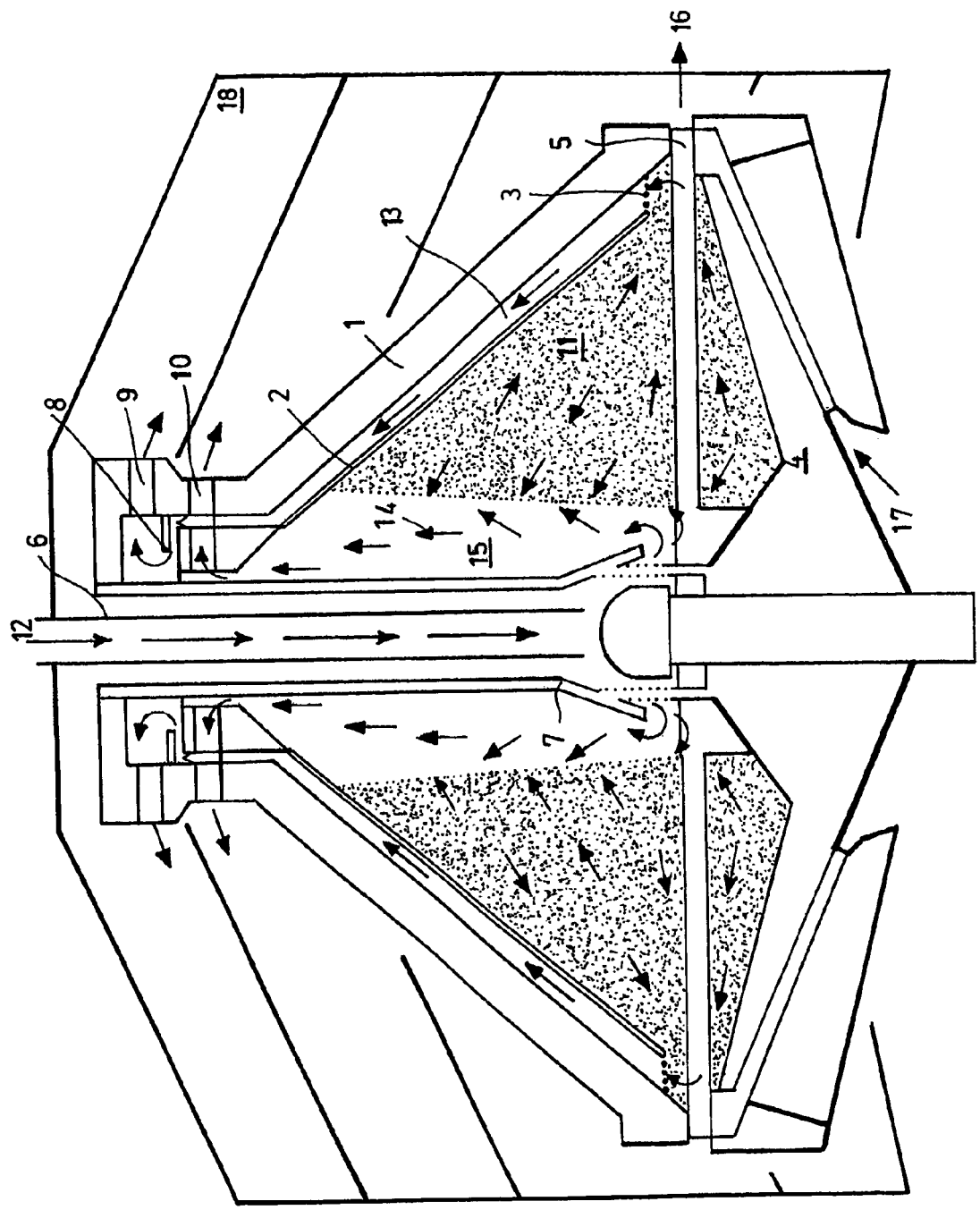

CONTINUOUS POROUS BED CENTRIFUGE

The present invention relates to a continuous porous bed centrifuge.

More specifically, the present invention relates to a continuous porous bed centrifuge for the continuous separation of immiscible liquids, for example water and mineral oil/petroleum, obtained by a modification to conventional disk centrifuges for increasing their efficiency. The disks have been substituted by a filling of solid particles which act as a filtrating and coalescent bed. Tests have been successfully carried out for deoiling of water associated with oil production.

Disk centrifuges are apparatuses used for the continuous or semi-continuous separation of liquids, possibly containing solid particles, based on the action of centrifugal force on the fluid introduced into a rotor. For the modification object of the present invention, centrifuges are considered which allow the discharge of the heavy liquid phase (aqueous). In order to automate the process and make it continuous, however, it is necessary to envisage the continuous discharge of the light phase (oil) and discharge of the solids. The inner part of rotors of conventional centrifuges generally contains truncated cone-shaped disks with spacers and holes for conveying the liquids. The heavy phase (liquid or solid) is concentrated in the outer part whereas the light phase tends to rise towards the rotation axis. The discharges of the two liquid phases leave the rotor and are collected by specific channels situated on the outer container. The discharge of the heavy liquid phase is controlled by a kind of weir (generally a disk with an internal calibrated hole) depending on to the fluid and operating conditions. The solids which accumulate in the rotor can be discharged at pre-established intervals. The complete discharge of the rotor is controlled by a washer activated by a hydraulic circuit which exploits the thrust generated by the centrifugal force.

In the upstream oil field, the large volumes involved and the cost are the main factors which limit the use of centrifuges, even if they have characteristics relating to efficiency, hindrance and flexibility in terms of feeding that can lead to their advantageous use in certain cases, for example on platforms.

The Applicants have now found that it is possible to provide various improvements to the purification process of layer water (heavy phase) which substantially reduces the concentrations of oil in waste water. It has been found, in fact, that it is possible to modify a conventional disk centrifuge by eliminating the disks and adapting the system so as to enable a filtrating filling to be charged and discharged during the rotation of the centrifuge. The modification introduced is aimed at forming a filtrating and coalescent bed subjected to centrifugal force in order to favour the adhesion of the oil particles to the porous surface of the bed and separate them from the aqueous phase.

An object of the present invention therefore relates to a continuous porous bed centrifuge for the continuous separation of a fluid consisting of two immiscible liquids in dispersion, which comprises:
a) a first outer compact essentially conical-shaped rotating skirt;
b) a second inner compact essentially conical-shaped skirt, integral with the outer skirt and positioned so as to form an interspace with said outer skirt;
c) a perforated toroidal-shaped separation element positioned at the base of the two skirts and suitable for separating the interspace from the inside of the centrifuge;
d) a closing base integral with the outer skirt by means of a sealing gasket;
e) a section, equipped with a weir acting as a flow regulator, fixed at the head of the outer skirt and with openings for the discharge of the separated liquids;
f) a first coaxial tube, integral with the outer skirt and with section (e);
g) a second coaxial tube which is not integral with the outer skirt, positioned inside the first tube, for the feeding of the dispersion;
h) a filling in the form of particles capable of filling from 40 to 70% of the inner volume of the centrifuge.

According to the present invention, the particle filling is contained inside the rotating system and is kept separate from the interspace between the two skirts by means of the toroidal-shaped separation element which has a width which is substantially identical to the thickness of the interspace. The separation element can be a net, a small-holed grid or a septum with calibrated holes or pores in relation to the dimension of the particles of the filling to be retained.

The separation element is positioned in the area which is as far away as possible from the rotation axis so as to catch the heavier liquid (for example deoiled water). During the rotation of the centrifuge, the fed fluid is forced outwards by the centrifugal force and passes through the bed of particles and is filtered. The heavy phase consequently flows through the separation element (net), passes into the cavity between the outer skirt and inner skirt and is discharged outside. Although subjected to centrifugal force, the filtering particles are withheld by the separation element.

The filtering and coalescent bed (filling) preferably consists of particles, for example sand, or spheres having different particle-sizes. The surfaces of the particles of the filling can be treated so as to have specific surface tension characteristics.

In particular, according to the present invention, the filling particles are spherical to favour their charging and discharging but can have any other shape, for example the form of cylinders, cubes, or other geometrical forms, balls of microfibers or generic sand.

The particles can be full or with cavities and the surfaces can be smooth or porous to increase the coalescence effect.

The density of the solid particles must be greater than that of the light liquid phase. It is preferable but not compulsory for them to be even denser than the heavy liquid phase.

The particles are rigid and can be treated on the surface to change the wettability and favour the coalescence process and facilitate the detachment between the grains both in the discharging and charging phase. Silicone coatings and treatment with silanizing agents have been tested on silicate small spheres.

The particles can be made of glass, polymeric materials, metal, oxides (for example silica, silicates, alumina), ion exchange resins, zeolites, hollow glass microspheres, sands, diatomaceous earth, but also crystals of salts with a low solubility in the heavy liquid phase.

The average dimensions of the filling particles can vary from 1 µm to 3 mm, determined by methods known to experts in the field (for example, the Coulter method). As reference dimension, spheres with a diameter of 500 µm are preferred. The distribution of the diameters can be well defined, distributed or bimodal. Larger particles can be charged, followed by finer particles.

The charging phase of the particles can be carried out in dry conditions or in the form of a slurry in the process liquid or other liquid. The charging liquid, if necessary, can be viscosized to help the suspension of the solid.

The charging and discharging phases of the filling can be automated. During the discharging, the filtered obstructing solids possibly contained in the dispersion to be separated, are also expelled with the filling particles. The discharging of the complete contents of the rotor reduces the necessity of frequent maintenance operations due to the fouling of the disks.

The continuous centrifuge, object of the present invention is now described with reference to the drawing of the enclosed FIGURE which represents an illustrative and non-limiting embodiment, assuming a water/oil dispersion as process fluid.

With reference to the drawing, (1) represents the outer rotating skirt, (2) the inner skirt, (3) the perforated separation element, (4) the closing base, (5) the gasket situated between the closing base and the outer skirt, (6) the feeding tube of the dispersion, non-rotating and coaxial with the tubular insert (7) which is part of the rotor. The high part of the rotor (8) is integral with the outer skirt and equipped with a weir for the flow regulation of the two separated fluids which are expelled from the openings (9) and (10). The filling (11) in particle form is indicated by the shaded area. The functioning of the continuous centrifuge, object of the present invention, appears evident on the basis of the enclosed FIGURE and the previous description. In particular, the centrifuge is activated by rotating the conical skirts and closing the gasket by the feeding of water (17). The centrifuge is charged with the filtering particles (11), and the fluid, or dispersion, (12) is subsequently fed to the device through the tube (6) and tubular insert (7). As a result of the centrifugal effect, the filling and fluid are forced against the walls of the inner skirt, thus obtaining the filtering action sice the oily component of the dispersion is retained by the filling particles. The filtered water passes through the perforated separation element (3), flows into the interspace (13) and, passing from the weir into (8), is discharged through the opening (9). The oil, or oily phase, (14) accumulates in the central body (15) and, by centrifugal force, is discharged through the second opening (10). The arrows indicate the course of the fluid; the dark arrows represent the dispersion/concentrated oily phase, the light arrows the filtered water.

When the filtering bed becomes blocked and must be substituted, the feeding of the dispersion is stopped and the centrifuge is optionally slowed down. The sealing gasket (5) is then released and the exhausted filtering bed can be discharged through the opening (16), which is formed between the conical skirt and the closure bottom.

During the functioning of the centrifuge, the sealing gasket, situated on a specific support, not illustrated in the FIGURE, is compressed against the periphery of the outer skirt by means of known methods. In the case illustrated, the gasket and respective support are forced against the outer skirt by the thrust generated by the centrifugal force and maintained by the water circulation (17). In the discharging phase, the water feeding (17) is stopped and the release of the gasket causes the formation of the opening (16). After the closing of the gasket by re-establishing the water feeding (17), the centrifuge can be charged again and reactivated. All the discharges expelled by centrifugation are collected in the channels positioned around the rotor and integral with the outer casing of the centrifuge (18).

For illustrative and non-limiting reasons, an experimental test is provided of the separation of a water/mineral oil dispersion by means of the centrifuge, object of the present invention, illustrated in the FIGURE. The centrifuge modified for the tests is a medium-small sized centrifuge which can treat up to 500 l/h of liquid.

The equipment is suitable for continuous separations of the heavy phase (water), light phase (oil) and solids and allows the regulation of the flow-rate ratios between the phases.

Oily water separation tests were carried out both in the laboratory, by using dispersions prepared artificially, and dispersions coming from an oil field.

The tests were effected using silicate spheres as filling particles, having an average diameter of 0.5 mm otherwise used for gravel pack in wells. The tests were carried out by comparing the performances of the centrifuge, object of the invention, and a conventional LAP X 202 disk centrifuge of ALFA LAVAL. The fluid used was a dispersion of oil in water with a concentration of 1,000 ppm.

The tests are compared after stabilization running for two hours at constant regime. The conditions compared were the following: 4600 and 6600 rpm, 170 l/h of feeding, room temperature, without modifying the surface of the particles or with a hydrophizing silicone coating. In spite of the variables, all the tests give the same results: the disk centrifuge separated the oil at 25-30 ppm whereas the centrifuge with the filling produced water containing only 8-12 ppm of oil.

Eight hour long tests were carried out in the field at 6600 rpm and 170 l/h of feeding, the water came from a three-phase separator, the temperature was 45° C., measured at the outlet of the centrifuge, the oil content in the dispersion oscillated between 300 and 700 ppm. All the samplings of the outgoing water, effected at different times, gave 18-20 ppm of oil with the disk centrifuge and 6-7 ppm with the modified centrifuge.

The invention claimed is:

1. A continuous porous bed centrifuge for the continuous separation of a fluid consisting of two immiscible liquids in dispersion, which comprises:
    a) a first outer compact essentially conical-shaped rotating skirt;
    b) a second inner compact essentially conical-shaped skirt, integral with the outer skirt and positioned so as to form an interspace with said outer skirt;
    c) a perforated toroidal-shaped separation element positioned at the base of the two skirts and suitable for separating the interspace from the inside of the centrifuge;
    d) a closing base integral with the outer skirt by means of a sealing gasket;
    e) a section, equipped with a weir acting as a flow regulator, fixed at the head of the outer skirt and with openings for the discharge of the separated liquids;
    f) a first coaxial tube, integral with the outer skirt and with section (e);
    g) a second coaxial tube which is not integral with the outer skirt, positioned inside the first tube, for the feeding of the dispersion;
    h) a filling in the form of particles capable of filling from 40 to 70% of the inner volume of the centrifuge.

2. The centrifuge according to claim 1, wherein the filling preferably consists of particles or spheres having different particle-sizes, optionally treated so as to have specific surface tension characteristics.

3. The centrifuge according to claim 2, wherein the filling particles are spherical.

4. The centrifuge according to claim 2, wherein the filling particles are in the form of cylinders, cubes, balls of microfibers.

5. The centrifuge according to claim 2, wherein the filling particles consists of sand.

6. The centrifuge according to claim 2, wherein the filling particles are full or with a cavity and the surfaces are either smooth or porous.

7. The centrifuge according to claim 2, wherein the filling particles are have a density greater than that of light liquid phase.

8. The centrifuge according to claim 2, wherein the filling particles are glass, polymeric materials, metal, oxides, ion exchange resins, zeolites, hollow glass microspheres, sands, infusorial earth, crystals of salts with a low solubility in the heavy liquid phase.

9. The centrifuge according to claim 2, wherein the filling particles have average dimensions ranging from 1 μm to 3 mm.

10. The centrifuge according to claim 1, wherein the filling particles are spherical.

11. The centrifuge according to claim 1, wherein the filling particles are in the form of cylinders, cubes, balls of microfibers.

12. The centrifuge according to claim 1, wherein the filling particles consist of sand.

13. The centrifuge according to claim 1, wherein the filling particles are full or with a cavity and the surfaces are either smooth or porous.

14. The centrifuge according to claim 1, wherein the filling particles have a density greater than that of the light liquid phase.

15. The centrifuge according to claim 1, wherein the filling particles are glass, polymeric materials, metal, oxides, ion exchange resins, zeolites, hollow glass microspheres, sands, infusorial earth, crystals of salts with a low solubility in the heavy liquid phase.

16. The centrifuge according to claim 1, wherein the filling particles have average dimensions ranging from 1 μm to 3 mm.

* * * * *